United States Patent
Craddock et al.

(10) Patent No.: US 11,699,207 B2
(45) Date of Patent: Jul. 11, 2023

(54) CAMERA ASSESSMENT TECHNIQUES FOR AUTONOMOUS VEHICLES

(71) Applicant: Waymo LLC, Mountain View, CA (US)

(72) Inventors: Carl Warren Craddock, San Francisco, CA (US); Andreas Wendel, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 379 days.

(21) Appl. No.: 16/105,069

(22) Filed: Aug. 20, 2018

(65) Prior Publication Data
US 2020/0055516 A1    Feb. 20, 2020

(51) Int. Cl.
| | |
|---|---|
| *G06T 3/40* | (2006.01) |
| *G05D 1/00* | (2006.01) |
| *G06F 18/22* | (2023.01) |
| *H04N 23/90* | (2023.01) |
| *G06V 20/56* | (2022.01) |
| *G06T 1/00* | (2006.01) |

(Continued)

(52) U.S. Cl.
CPC ........... *G06T 1/0007* (2013.01); *B60W 30/09* (2013.01); *G05D 1/0088* (2013.01); *G06F 18/22* (2023.01); *G06T 3/40* (2013.01); *G06V 10/98* (2022.01); *G06V 20/56* (2022.01); *H04N 17/002* (2013.01); *H04N 23/90* (2023.01); *B60W 2420/42* (2013.01); *G06T 2210/22* (2013.01)

(58) Field of Classification Search
CPC ............. B60W 30/09; B60W 2420/42; G05D 1/0088; G06K 9/6215; G06T 3/40; G06T 2210/22; H04N 5/247; H04N 17/002
See application file for complete search history.

(56) References Cited

U.S. PATENT DOCUMENTS

| | | | |
|---|---|---|---|
| 5,214,408 A | 5/1993 | Asayama | |
| 5,825,464 A | 10/1998 | Feichtner | |

(Continued)

FOREIGN PATENT DOCUMENTS

| | | |
|---|---|---|
| DE | 4100501 A1 | 7/1992 |
| EP | 2642759 A1 | 9/2013 |

(Continued)

OTHER PUBLICATIONS https://en.wikipedia.org/wiki/Color_difference#CIE76, downloaded Jul. 2018 (7 pgs.).

(Continued)

*Primary Examiner* — Yazan A Soofi
*Assistant Examiner* — Naeem Taslim Alam
(74) *Attorney, Agent, or Firm* — Botos Churchill IP Law

(57) ABSTRACT

The disclosure relates to assessing operation of two or more cameras. These cameras may be a group of cameras of a perception system of a vehicle having an autonomous driving mode. A first image captured by a first camera and a second image captured by a second camera may be received. A first feature vector for the first image and a second feature vector for the second image may be generated. A similarity score may be determined using the first feature vector and the second feature vector. This similarity score may be used to assess the operation of the two cameras and an appropriate action may be taken.

20 Claims, 12 Drawing Sheets

(51) Int. Cl.
  *B60W 30/09* (2012.01)
  *H04N 17/00* (2006.01)
  *G06V 10/98* (2022.01)

(56) References Cited

U.S. PATENT DOCUMENTS

| | | |
|---|---|---|
| 7,676,110 B2 | 3/2010 | Steinberg et al. |
| 7,813,888 B2 | 10/2010 | Vian et al. |
| 7,991,550 B2 | 8/2011 | Zeng |
| 8,195,358 B2 | 6/2012 | Anderson |
| 8,229,618 B2 | 7/2012 | Tolstedt et al. |
| 8,521,352 B1 | 8/2013 | Ferguson et al. |
| 8,560,165 B2 | 10/2013 | Salman et al. |
| 8,630,806 B1 | 1/2014 | Zhu |
| 9,201,421 B1 | 12/2015 | Fairfield et al. |
| 9,221,396 B1 | 12/2015 | Zhu et al. |
| 9,251,598 B2 | 2/2016 | Wells et al. |
| 9,310,210 B2 | 4/2016 | Stahlin et al. |
| 9,436,880 B2 | 9/2016 | Bos et al. |
| 9,654,738 B1 | 5/2017 | Ferguson et al. |
| 9,779,314 B1 | 10/2017 | Wendel et al. |
| 9,900,522 B2 * | 2/2018 | Lu .................. H04N 23/698 |
| 9,942,522 B2 | 4/2018 | Shaw |
| 10,176,405 B1 * | 1/2019 | Zhou .................. G06T 7/246 |
| 2003/0030744 A1 * | 2/2003 | Baer .................. H04N 23/70 348/241 |
| 2004/0167717 A1 | 8/2004 | Buchanan et al. |
| 2005/0192727 A1 | 9/2005 | Shostak et al. |
| 2005/0240328 A1 | 10/2005 | Shirato et al. |
| 2006/0034487 A1 | 2/2006 | Franz |
| 2006/0208169 A1 | 9/2006 | Breed et al. |
| 2007/0286497 A1 | 12/2007 | Podilchuk |
| 2007/0291130 A1 | 12/2007 | Broggi et al. |
| 2008/0012938 A1 | 1/2008 | Kubota et al. |
| 2008/0162027 A1 | 7/2008 | Murphy et al. |
| 2008/0170122 A1 * | 7/2008 | Hongo .................. G06T 7/33 348/148 |
| 2009/0021581 A1 | 1/2009 | Sun et al. |
| 2009/0030569 A1 | 1/2009 | Thorne |
| 2009/0059084 A1 * | 3/2009 | Okada .................. H04N 5/144 348/E5.062 |
| 2009/0115610 A1 | 5/2009 | Steinhage et al. |
| 2009/0177347 A1 | 7/2009 | Breuer et al. |
| 2010/0094499 A1 * | 4/2010 | Anderson .................. G05D 1/0295 700/13 |
| 2010/0104199 A1 | 4/2010 | Zhang et al. |
| 2010/0104208 A1 * | 4/2010 | Murata .................. G06T 5/003 382/255 |
| 2010/0169013 A1 | 7/2010 | Nakamura et al. |
| 2010/0253918 A1 | 10/2010 | Seder et al. |
| 2010/0312461 A1 | 12/2010 | Haynie et al. |
| 2011/0035123 A1 | 2/2011 | Katrak et al. |
| 2011/0043377 A1 | 2/2011 | Lindsay et al. |
| 2011/0075518 A1 | 3/2011 | Huhta et al. |
| 2011/0115615 A1 | 5/2011 | Luo et al. |
| 2011/0118967 A1 | 5/2011 | Tsuda |
| 2011/0130916 A1 | 6/2011 | Mayer |
| 2011/0166746 A1 | 7/2011 | Breuer et al. |
| 2011/0242319 A1 * | 10/2011 | Miyajima .................. G06T 7/74 348/148 |
| 2012/0014453 A1 | 1/2012 | Kawai et al. |
| 2012/0136510 A1 | 5/2012 | Min et al. |
| 2012/0206575 A1 | 8/2012 | Massanell et al. |
| 2012/0269387 A1 | 10/2012 | Becker et al. |
| 2012/0308114 A1 * | 12/2012 | Othmezouri .................. G06T 7/285 382/154 |
| 2013/0030756 A1 | 1/2013 | Bielski et al. |
| 2013/0058527 A1 | 3/2013 | Peynot |
| 2013/0083201 A1 | 4/2013 | Takacs |
| 2013/0177237 A1 * | 7/2013 | Schamp .................. G06V 10/421 382/154 |
| 2013/0184929 A1 | 7/2013 | Salman et al. |
| 2013/0208121 A1 | 8/2013 | Wu et al. |
| 2013/0218398 A1 | 8/2013 | Gandhi et al. |
| 2013/0245877 A1 | 9/2013 | Ferguson et al. |
| 2013/0300872 A1 | 11/2013 | Park |
| 2013/0321629 A1 | 12/2013 | Zhang et al. |
| 2013/0335553 A1 | 12/2013 | Heger et al. |
| 2014/0343889 A1 * | 11/2014 | Ben Shalom .................. A61B 5/1115 600/595 |
| 2015/0049345 A1 * | 2/2015 | Miyagawa .................. G01B 11/2522 356/625 |
| 2015/0145965 A1 * | 5/2015 | Livyatan .................. H04N 13/239 348/47 |
| 2015/0284009 A1 | 10/2015 | Cullinane et al. |
| 2015/0371095 A1 | 12/2015 | Hartmann et al. |
| 2016/0007018 A1 | 1/2016 | Ooi |
| 2016/0057332 A1 * | 2/2016 | Ciurea .................. H04N 25/585 348/218.1 |
| 2016/0105679 A1 | 4/2016 | Murao et al. |
| 2016/0155020 A1 * | 6/2016 | Tariq .................. G06V 20/63 382/218 |
| 2016/0159281 A1 | 6/2016 | Jang et al. |
| 2016/0210533 A1 | 7/2016 | Kiapour et al. |
| 2016/0248987 A1 * | 8/2016 | Zilly .................. H04N 23/741 |
| 2016/0379066 A1 | 12/2016 | Reiche et al. |
| 2016/0379085 A1 | 12/2016 | Dodballapur et al. |
| 2017/0090739 A1 | 3/2017 | Kozuka et al. |
| 2017/0339417 A1 * | 11/2017 | Puri .................. G06F 18/2178 |
| 2018/0027224 A1 * | 1/2018 | Javidnia .................. G06V 10/758 382/154 |
| 2018/0048801 A1 | 2/2018 | Kiser et al. |
| 2018/0101740 A1 | 4/2018 | Xie et al. |
| 2018/0137628 A1 * | 5/2018 | Shoda .................. G06T 7/246 |
| 2018/0139368 A1 | 5/2018 | Nakayama |
| 2018/0144202 A1 | 5/2018 | Moosaei et al. |
| 2018/0150949 A1 * | 5/2018 | Matono .................. G01C 3/06 |
| 2018/0156913 A1 | 6/2018 | Baba |
| 2018/0188059 A1 | 7/2018 | Wheeler et al. |
| 2019/0011927 A1 * | 1/2019 | Mou .................. G06T 7/254 |
| 2019/0052792 A1 * | 2/2019 | Baba .................. H04N 13/327 |
| 2019/0092287 A1 * | 3/2019 | Leach .................. B60S 1/56 |
| 2019/0129444 A1 * | 5/2019 | Wirth .................. G05D 1/0274 |
| 2019/0132572 A1 * | 5/2019 | Shen .................. G01S 17/86 |
| 2019/0243376 A1 * | 8/2019 | Davis .................. H04N 23/71 |
| 2019/0256054 A1 * | 8/2019 | Turner .................. B60S 1/56 |
| 2019/0281202 A1 * | 9/2019 | Chen .................. H04N 23/75 |
| 2019/0295282 A1 * | 9/2019 | Smolyanskiy .................. G01S 17/88 |
| 2019/0370574 A1 | 12/2019 | Wang et al. |
| 2019/0379859 A1 * | 12/2019 | Takagi .................. H04N 7/0142 |
| 2020/0005489 A1 * | 1/2020 | Kroeger .................. G06V 20/56 |
| 2020/0036889 A1 * | 1/2020 | Udayakumar .................. H04N 23/70 |
| 2020/0050196 A1 * | 2/2020 | Liao-McPherson .................. G05B 13/048 |
| 2020/0065622 A1 * | 2/2020 | Korosi-Szabo .................. G06F 18/214 |
| 2020/0098394 A1 * | 3/2020 | Levinson .................. G06N 20/00 |
| 2021/0232871 A1 | 7/2021 | Iancu et al. |
| 2021/0343044 A1 * | 11/2021 | Lee .................. B60R 1/00 |

FOREIGN PATENT DOCUMENTS

| | | |
|---|---|---|
| JP | 6-195121 | 7/1994 |
| JP | 2004020237 A | 1/2004 |
| JP | 2006060425 A | 3/2006 |
| JP | 2009234344 A | 10/2009 |
| JP | 2010093570 A | 4/2010 |
| JP | 2012075060 A | 4/2012 |
| JP | 2013224922 A | 10/2013 |
| JP | 2014043121 A | 3/2014 |
| JP | 2015028702 A | 2/2015 |
| JP | 2016015638 A | 1/2016 |
| JP | 2018060422 A | 4/2018 |
| WO | 2018106752 A1 | 6/2018 |

OTHER PUBLICATIONS

International Search Report and Written Opinion for Application No. PCTUS2019/047029 dated Dec. 6, 2019.
The Extended European Search Report for European Patent Application No. 19852764.0, dated Feb. 25, 2022.

(56) References Cited

OTHER PUBLICATIONS

Pons, et al., "Assessing Machine Learning Classifiers for the Detection of Animals' Behavior Using Depth-Based Tracking", Expert Systems with Applications, 2017, vol. 86, pp. 235-246.
Sung, et al., "Real-Time Traffic Light Recognition on Mobile Devices with Geometry-Based Filtering", Seventh International Conference on Distributed Smart Cameras (ICDSC), IEEE, 2013, pp. 1-7.
Tout, "Automatic Vision System for Surface Inspection and Monitoring: Application to Wheel Inspection", Signal and Image Processing, Universite de Technologic de Troyes, 2018, pp. 1-188.
Notice of Reasons for Rejection for Japanese Patent Application No. 2021-507749, dated Apr. 26, 2022.
"What is Cumulative Sum Control Chart," The Institute of Japanese Union of Scientists & Engineers, 2012, url: https://web.archive.org/web/20120712024821/https://www.i-juse.co.jp/statistics/product/func/process/cumulative-sum-control-chart.html.
Decision to Grant for Japanese Patent Application No. 2021-507749, dated Nov. 8, 2022.

\* cited by examiner

CAMERA ASSESSMENT TECHNIQUES FOR AUTONOMOUS VEHICLES

BACKGROUND

Autonomous vehicles, such as vehicles that do not require a human driver, can be used to aid in the transport of passengers or items from one location to another. Such vehicles may operate in a fully autonomous driving mode where passengers may provide some initial input, such as a destination, and the vehicle maneuvers itself to that destination. Thus, such vehicles may be largely dependent on systems that are capable of determining the location of the autonomous vehicle at any given time, as well as detecting and identifying objects external to the vehicle, such as other vehicles, stop lights, pedestrians, etc. As an example, these systems may include sensors, such as laser scanning equipment and cameras, mounted at various locations on the vehicle. Accordingly, being able to assess the operation of such sensors in real time is critical to ensuring that the vehicle is not relying on sensor data from a non-functioning or debris-covered sensor when making driving decisions.

BRIEF SUMMARY

Aspects of the disclosure provide a method for assessing operation of two cameras or more. The method comprises receiving, by one or more processors, a first image captured by a first camera; receiving, by the one or more processors, a second image captured by a second camera, the first camera and the second camera having an overlapping field of view; generating, by the one or more processors, a first feature vector for the first image and a second feature vector for the second image; determining, by the one or more processors, a similarity score using the first feature vector and the second feature vector; and using, by the one or more processors, the similarity score to assess the operation of the two cameras.

In one example, the first image and the second image are differently exposed. In another example, the first camera includes an ND filter and the second camera does not. In another example, an exposure period of the first image is longer than an exposure period of the second image. In another example, the first image and the second image are captured within a predetermined period of time so as to capture an object in a given position within the overlapping field of view. In another example, the method also includes, before generating the first feature vector and the second feature vector, reducing the first image and the second image. In this example, reducing the first image and the second image includes cropping the first image and the second image to include only pixels corresponding to the overlapping field of view. In addition or alternatively, reducing the first image and the second image includes thumbnailing the first image and the second image.

In another example, the first feature vector and the second feature vector are generated further based on a time of day. In another example, the first feature vector and the second feature vector are generated to include only features corresponding to light emitting objects. In another example, generating the similarity score includes using structure similarity index. In another example, using the similarity score includes comparing the similarity score to a threshold value. In another example, using the similarity score includes comparing the similarity score with other similarity scores generated from images from the first camera and the second camera over time. In this example, comparing the similarity score with other similarity score includes using a cumulative sum control chart. In another example, the method also includes, based on the assessment, sending a request for assistance to a remote computing device, the request including the first image and the second image. In this example, the method also includes, after sending the request, sending an updated image from the first camera and an updated image from the second camera to the remote computing device. In addition or alternatively, the method also includes in response to the request, receiving instructions to stop a vehicle and stopping the vehicle in response to the request. In another example, the method also includes activating a cleaning system for one or both of the first camera and the second camera. In another example, the method also includes controlling, by the one or more processors, a vehicle in an autonomous driving mode by making a driving decision based on the assessment. In this example, controlling the vehicle, includes discarding all or a portion of one or both of the first image and the second image when making the driving decision.

DETAILED DESCRIPTION

Overview

Figure 1:
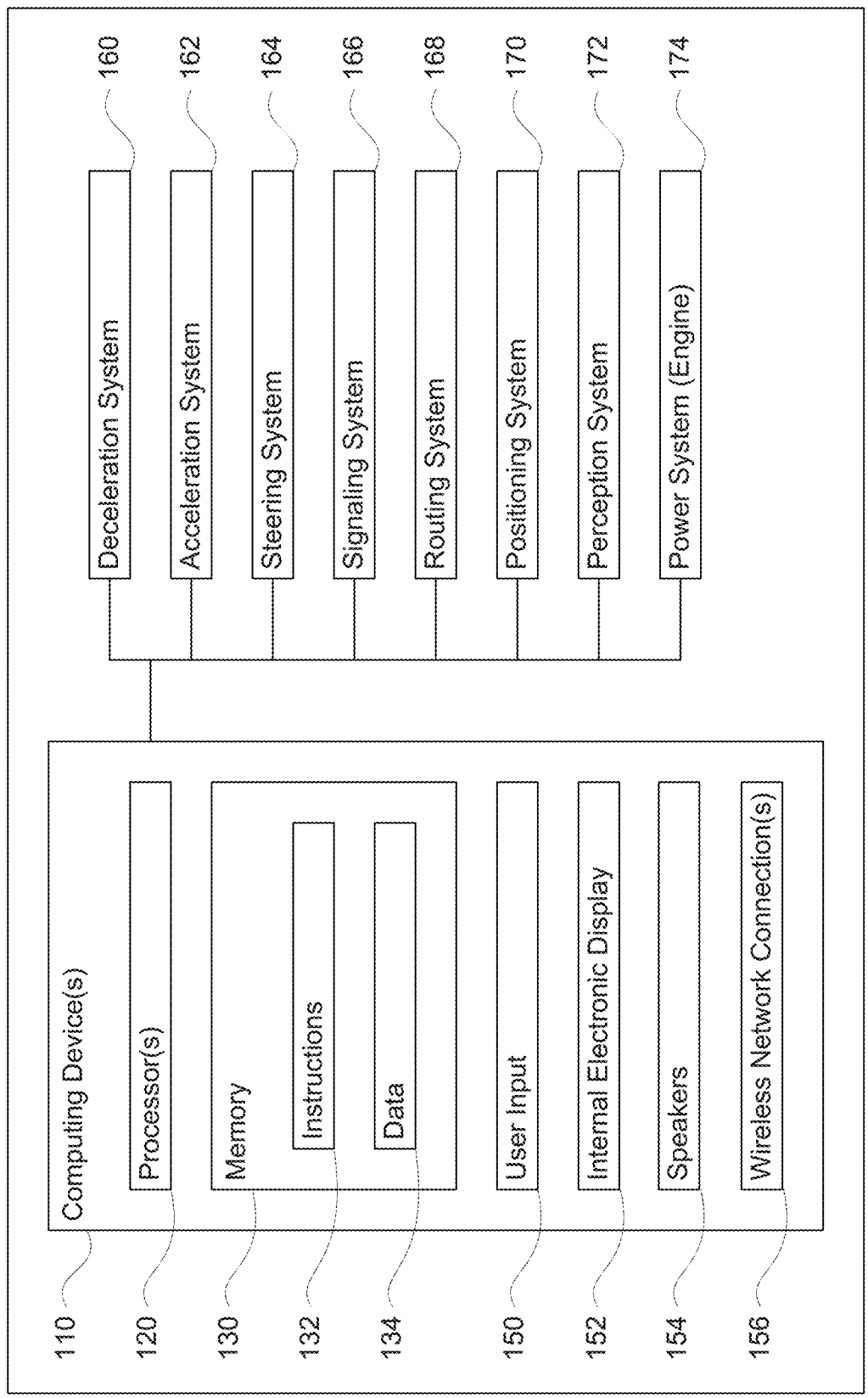
FIG. 1 is a functional diagram of an example vehicle in accordance with aspects of the disclosure according to aspects of the disclosure.

This technology relates to assessing the operation of two or more cameras or rather, confirming that the cameras as functioning properly. For instance, it can be difficult to know whether the camera is "seeing" the world properly or if there is some foreign object debris on a lens, condensation, non-functioning pixels, etc. This can be especially important in the case of autonomous vehicles which rely upon such cameras to make driving decisions.

For instance, an autonomous vehicle's perception system may include a plurality of cameras and other sensors. The cameras may have different configurations, for instance, different filters, etc. but may be configured to capture images periodically. At least some of these cameras, and therefore some of the captured images, may have overlapping fields of view. The functionality of a pair of cameras with overlapping fields of view may be validated by selecting a pair of images captured from each camera. Ideally, these images are captured very close in time or within some predetermined period of time so as to capture one or more of the same objects in the same position within the overlapping field of view.

The size of the images may be reduced in order to simplify processing. For instance, images maybe reduced in size, and/or otherwise cropped to include only the portions corresponding to the overlapping field of view.

The reduced images may then be analyzed to generate feature vectors. These feature vectors would thus represent the features in the reduced images. These feature vectors may then be compared to determine a similarity score or how similar they are to one another. The similarity score may be determined using on a cosine similarity measure, clustering techniques, or other vector similarity measurement techniques.

The similarity scores may be compared to a threshold value to determine whether the similarity between the reduced images is too low, or rather the images are so different that it is likely that one of the cameras has an error or is occluded. In many cases, the threshold may be sufficient to identify changes, such as when condensation forms slowly on one of the camera's lenses. However, in some instances, the threshold may not necessarily identify the problem. In such instances, similarity scores of many images from two cameras may be compared overtime in order to identify abrupt changes.

If the threshold is met or if an abrupt change is detected, the vehicle's computing devices may assume that one or both of the cameras has a problem. As such, an appropriate response may be taken. In addition, this process may be performed periodically such as every time a pair of images is captured between the two cameras with overlapping fields of view or less often.

While the aforementioned technique works well during daylight hours where ambient lighting is good, in darker or nighttime environments, the similarity scores and SSIM may become unreliable. During such time, rather than matching all features in two reduced images, only bright spots or high intensity areas may be compared. Again, the similarity scores for these vectors may again be determined and compared to a threshold and/or tracked to identify whether one of the cameras has an issue. Thereafter, an appropriate response may be taken.

The features described herein allow for reliable camera assessment during various lighting conditions. As noted above, it is incredibly challenging to determine whether a camera is "seeing" the world properly or if there is some foreign object debris on a lens, condensation, non-functioning pixels, etc. This can be especially important in the case of autonomous vehicles which rely upon such cameras to make driving decisions.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may capable of communicating with various components of the vehicle in order to maneuver vehicle 100 in a fully autonomous driving mode and/or semi-autonomous driving mode. For example, returning to FIG. 1, computing devices 110 may be in communication with various systems of vehicle 100, such as deceleration system 160, acceleration system 162, steering system 164, signaling system 166, navigation system 168, positioning system 170, perception system 172, and power system 174 (for instance) a gasoline or diesel powered motor or electric engine) in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways. In addition, this map information may include information regarding traffic controls, such as traffic signal lights, stop signs, yield signs, etc., which, in conjunction with real time information received from the perception system 172, can be used by the computing devices 110 to determine which directions of traffic have the right of way at a given location.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing devices 110. The sensors of the perception system may detect objects in the external environment of the vehicle and generate sensor data describing characteristics of such objects such as location, orientation, size, shape, type, direction and speed of movement, etc. The raw sensor data from the sensors and/or the aforementioned characteristics can be quantified or arranged into a descriptive function or vector and sent for further processing to the computing devices 110. As discussed in further detail below, computing devices 110 may use the positioning system 170 to determine the vehicle's location and perception system 172 to detect and respond to objects when needed to reach the location safely.

Figure 2:
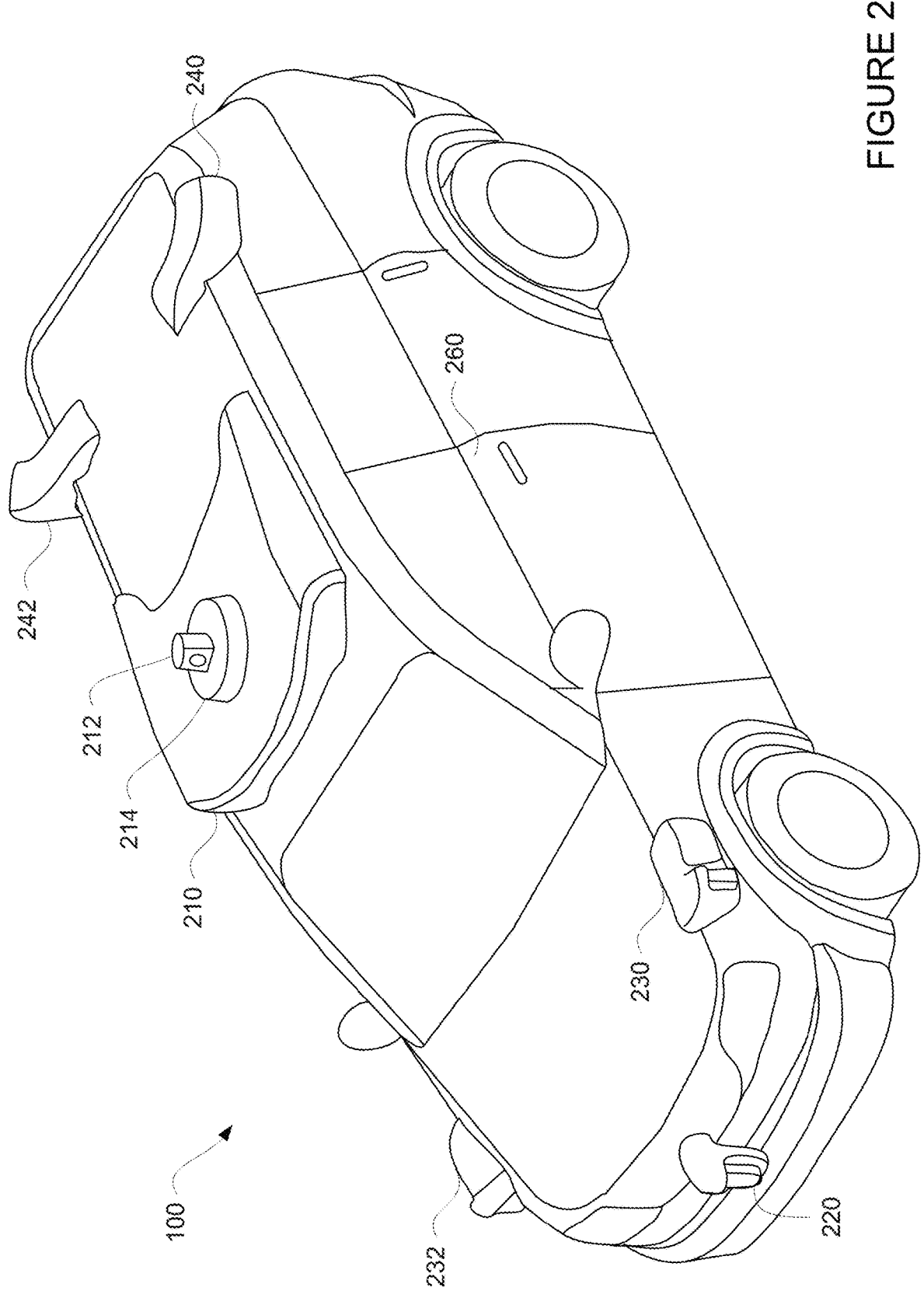
FIG. 2 is an example external view of the example vehicle of FIG. 1 in accordance with aspects of the disclosure.

For instance, FIG. 2 is an example external view of vehicle 100. In this example, rooftop housing 210 and housings 212, 214 may include a LIDAR sensor as well as various cameras and radar units. In addition, housing 220 located at the front end of vehicle 100 and housings 230, 232 on the driver's and passenger's sides of the vehicle may each store a LIDAR sensor. For example, housing 230 is located in front of driver door 260. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or rooftop housing 210.

The cameras of the perception system 172 may be arranged on the vehicle such that there are at least two cameras that periodically capture most points in the vehicle's environment. Some points in front of the vehicle (i.e. in the direction of travel) may also be "seen" by long-distance cameras. Each camera of the perception system may thus be grouped with one or more other cameras in a "camera group" for assessment purposes.

Figure 3:
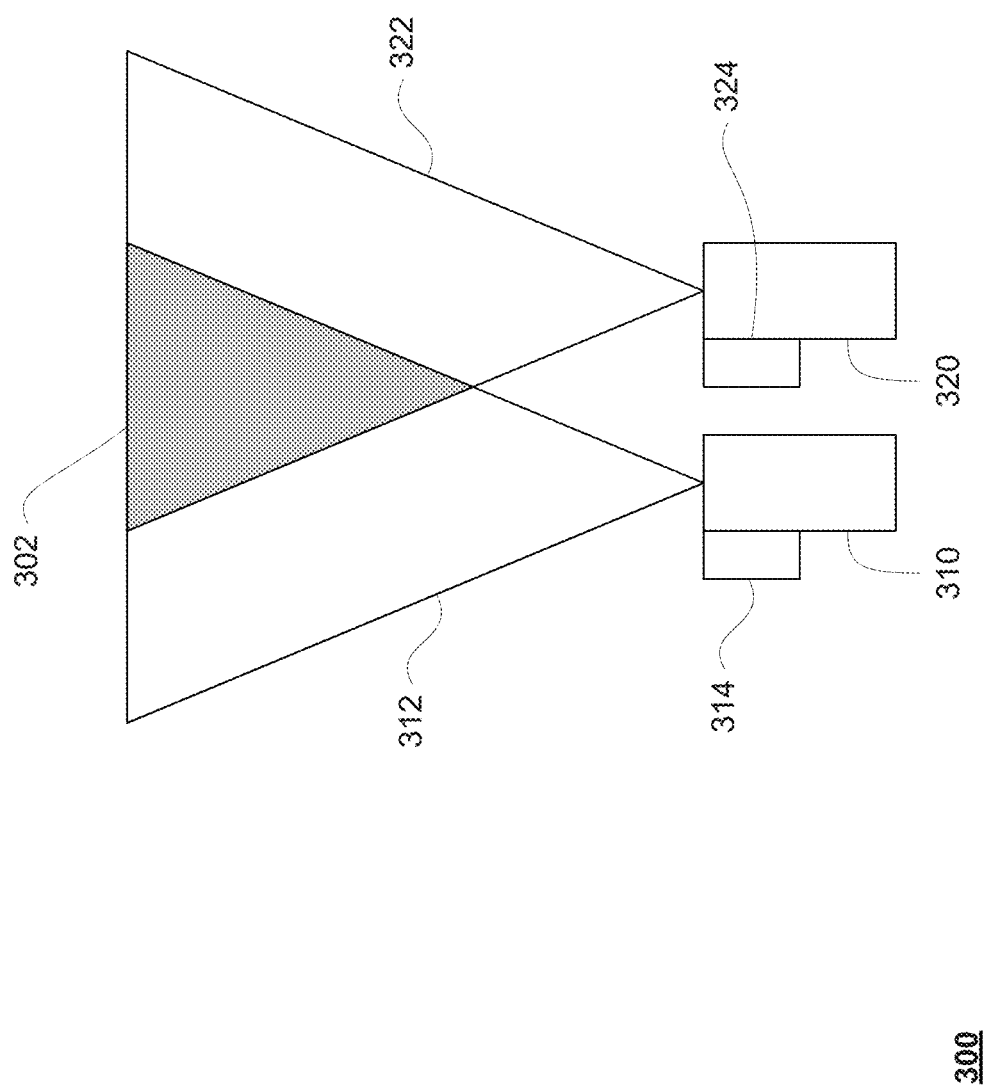
FIG. 3 is an example of a camera group in accordance with aspects of the disclosure.
Figure 4:
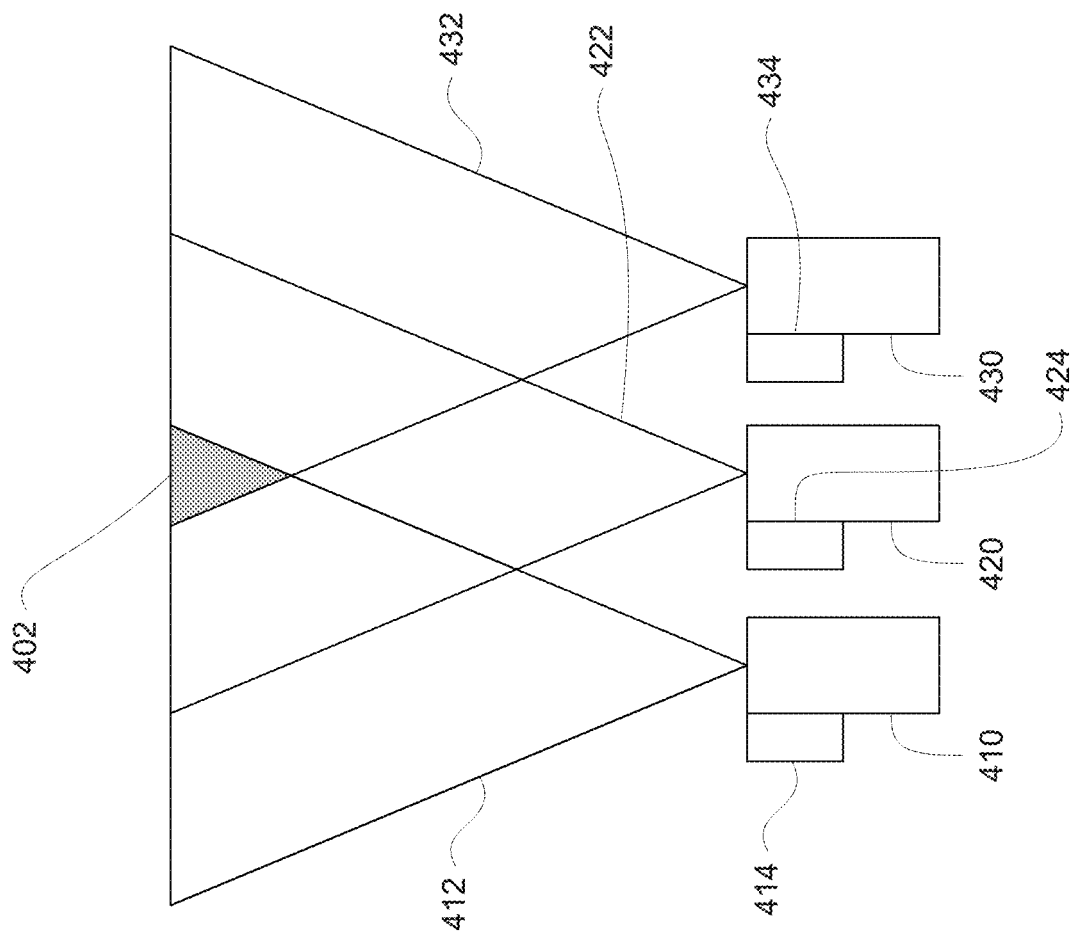
FIG. 4 is another example of a camera group in accordance with aspects of the disclosure.

FIG. 3 is an example of a camera group 300 including two cameras 310, 320 with overlapping fields of view 312, 322. FIG. 4 is an example of a camera group 400 including three cameras 410, 420, 430 with fields of view 412, 422, 432 having overlapping portions 302, 402. As such, the cameras of the groups, and therefore the images captured by these groups, may have overlapping fields of view. Each camera of a camera group may have a cleaning system 314, 324, 414, 424, 434 that may include a wiper and/or washer fluid in order to clear a lens of the camera. Operation of the cleaning systems may be controlled, for instance, by computing devices 110. The cameras of each camera group may be fixed relative to one another and with respect to the vehicle in order to ensure that the overlapping field of view remains consistent.

Figure 5:
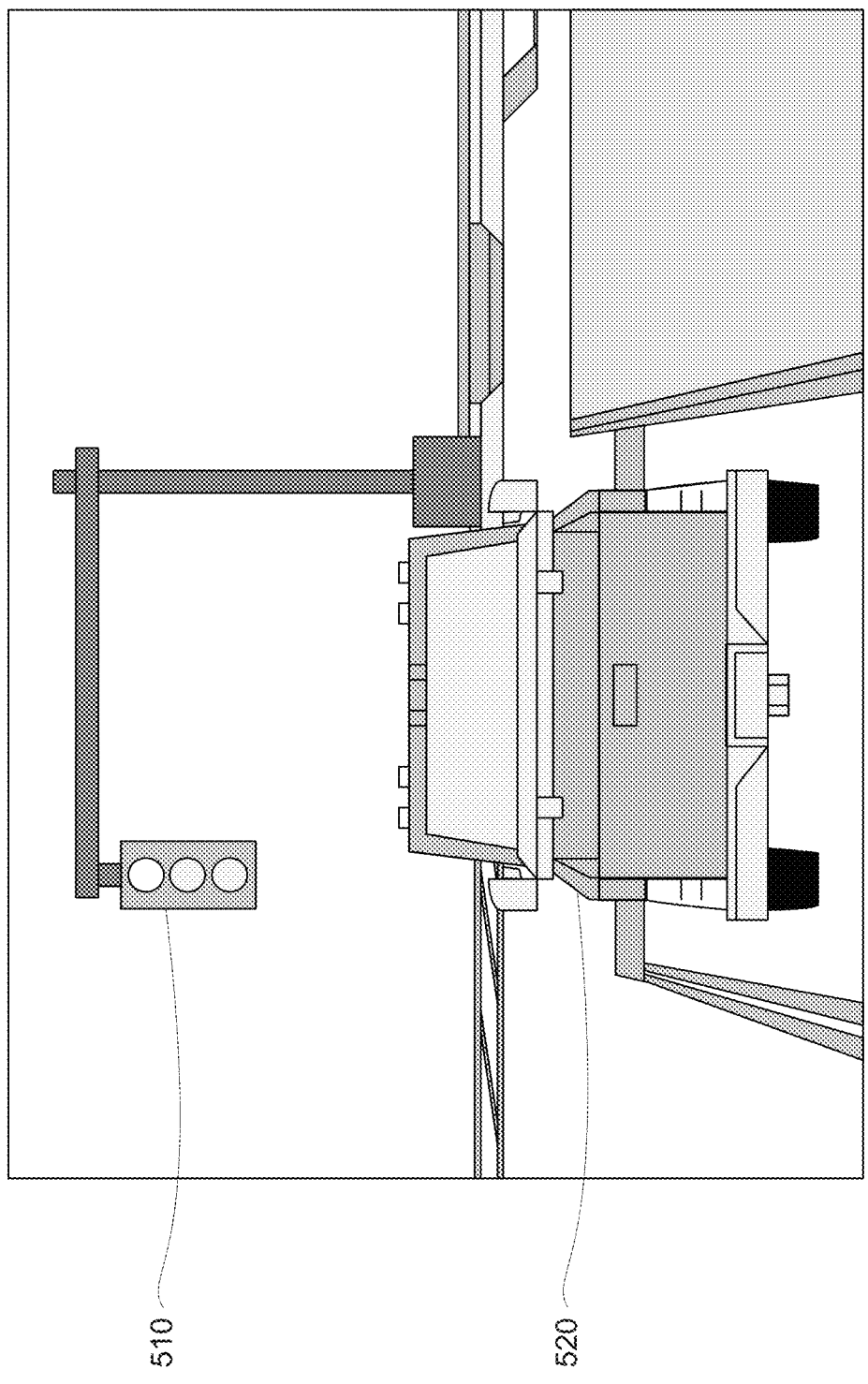
FIG. 5 is an example image in accordance with aspects of the disclosure.
Figure 6:
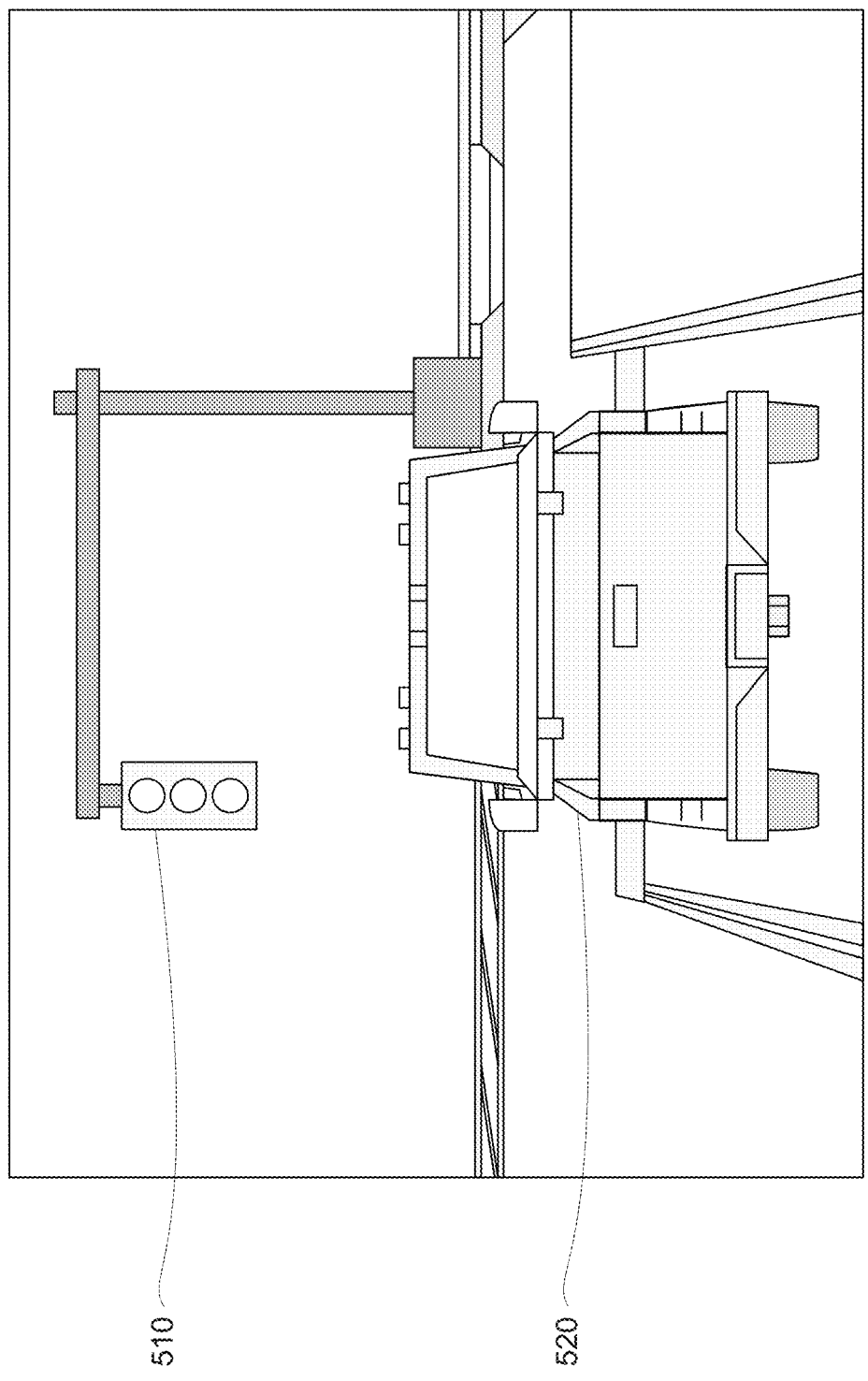
FIG. 6 is another example image in accordance with aspects of the disclosure.

In addition, each of the cameras in these groups may have the same or different configurations, for instance, different filters, etc. In some instances, the images may be differently exposed, that is, the images may be captured using different filtering techniques and/or exposure periods. For instance, referring to the images 500 and 600 of FIGS. 5 and 6, one image 500 may be captured using a first camera, such as camera 310, with an ND filter over a first exposure period and a second image 600 may be captured using a second camera, such as camera 320, without an ND filter over a second exposure period. The first and second exposure times may be the same or different, for instance, the second exposure period may be shorter than the first exposure period. As an example, the first image 500 may include a traffic light 510 and a vehicle 520 and possibly rough contours of other objects. The second image 600 may include the traffic light 510 overexposed and the vehicle 520 overexposed.

Figure 7:
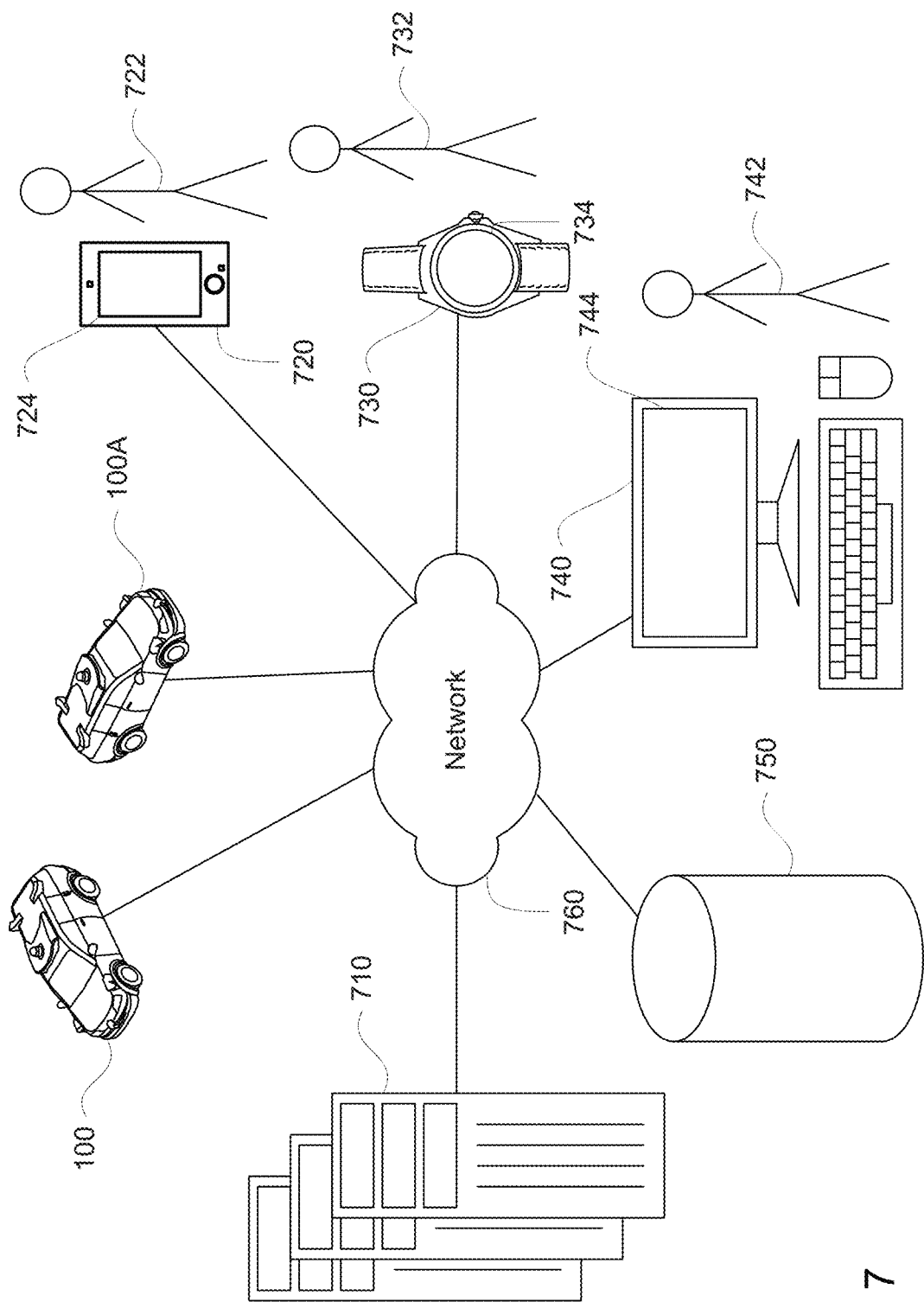
FIG. 7 is a pictorial diagram of an example system in accordance with aspects of the disclosure.
Figure 8:
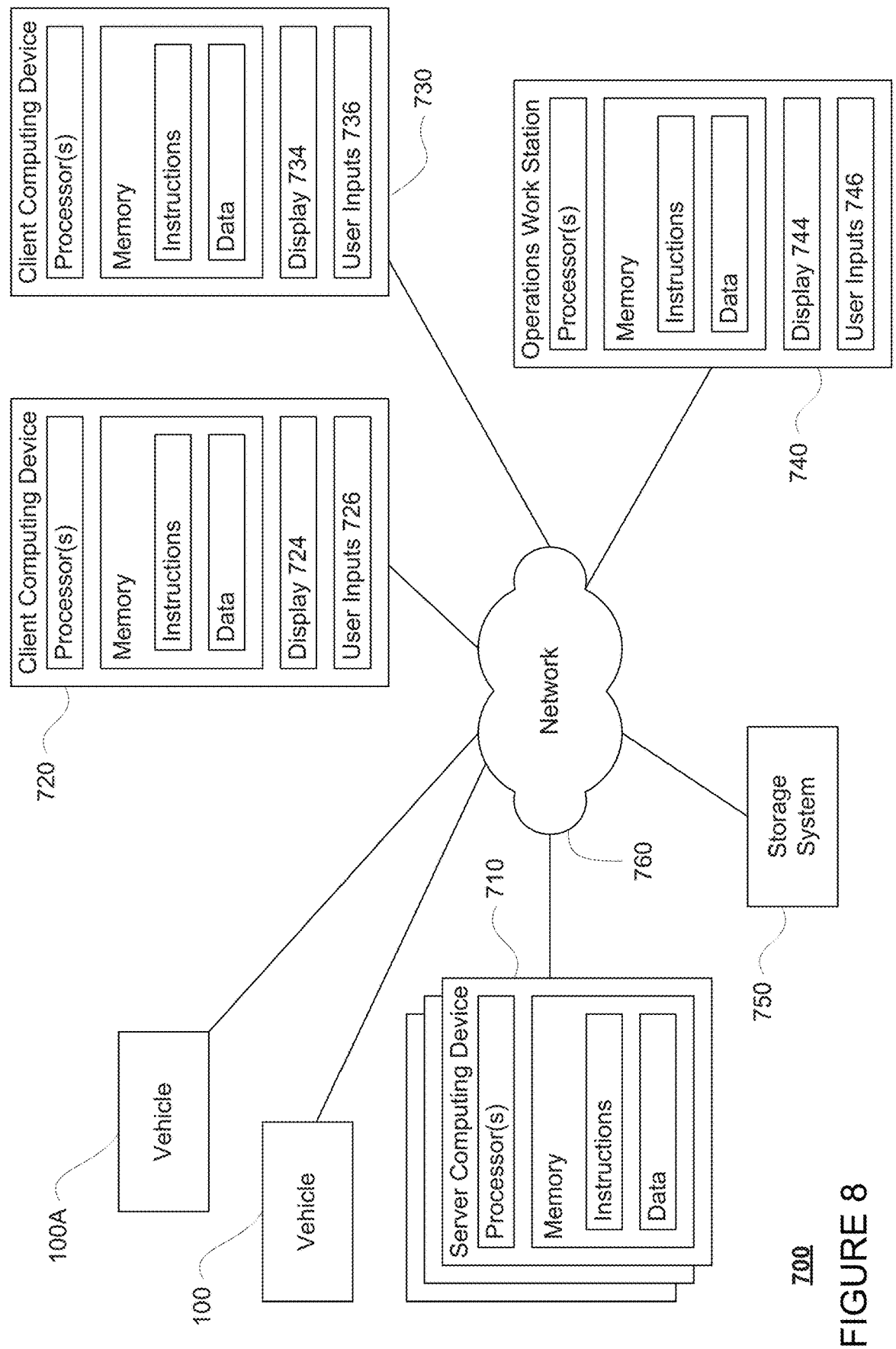
FIG. 8 is a functional diagram of the system of FIG. 7 in accordance with aspects of the disclosure.

Computing device 110 of vehicle 100 may also receive or transfer information to and from other computing devices, such as those computing devices that are a part of the transportation service as well as other computing devices. FIGS. 7 and 8 are pictorial and functional diagrams, respectively, of an example system 700 that includes a plurality of computing devices 710, 720, 730, 740 and a storage system 750 connected via a network 760. System 700 also includes vehicle 100, and vehicles 100A, 100B which may be configured the same as or similarly to vehicle 100. Although only a few vehicles and computing devices are depicted for simplicity, a typical system may include significantly more.

As shown in FIG. 7, each of computing devices 710, 720, 730, 740 may include one or more processors, memory, data and instructions. Such processors, memories, data and instructions may be configured similarly to one or more processors 120, memory 130, instructions 132, and data 134 of computing device 110.

The network 760, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 710 may include one or more server computing devices having a plurality of computing devices, e.g., a load balanced server farm, that exchange information with different nodes of a network for the purpose of receiving, processing and transmitting the data to and from other computing devices. For instance, one or more computing devices 710 may include one or more server computing devices that are capable of communicating with computing device 110 of vehicle 100 or a similar computing device of vehicle 100A as well as computing devices 720, 730, 740 via the network 760. For example, vehicles 100, 100A, may be a part of a fleet of vehicles that can be dispatched by server computing devices to various locations. In this regard, the server computing devices 710 may function as a validation computing system which can be used to validate autonomous control software which vehicles such as vehicle 100 and vehicle 100A may use to operate in an autonomous driving mode. In addition, server computing devices 710 may use network 760 to transmit and present information to a user, such as user 722, 732, 742 on a display, such as displays 724, 734, 744 of computing devices 720, 730, 740. In this regard, computing devices 720, 730, 740 may be considered client computing devices.

As shown in FIG. 7, each client computing device 720, 730, 740 may be a personal computing device intended for use by a user 722, 732, 742, and have all of the components normally used in connection with a personal computing device including a one or more processors (e.g., a central processing unit (CPU)), memory (e.g., RAM and internal hard drives) storing data and instructions, a display such as displays 724, 734, 744 (e.g., a monitor having a screen, a touch-screen, a projector, a television, or other device that is operable to display information), and user input devices 726, 736, 746 (e.g., a mouse, keyboard, touchscreen or microphone). The client computing devices may also include a camera for recording video streams, speakers, a network interface device, and all of the components used for connecting these elements to one another.

Although the client computing devices 720, 730, and 740 may each comprise a full-sized personal computing device, they may alternatively comprise mobile computing devices capable of wirelessly exchanging data with a server over a network such as the Internet. By way of example only, client computing device 720 may be a mobile phone or a device such as a wireless-enabled PDA, a tablet PC, a wearable computing device or system, or a netbook that is capable of obtaining information via the Internet or other networks. In another example, client computing device 730 may be a wearable computing system, shown as a wristwatch as shown in FIG. 7. As an example the user may input information using a small keyboard, a keypad, microphone, using visual signals with a camera, or a touch screen.

In some examples, client computing device 740 may be an operations workstation used by an administrator or other human operator, such as user 742, to respond to requests for assistance received from the computing devices of vehicles such as vehicle 100 and vehicle 100A. Although only a single operations workstation 740 is shown in FIGS. 7 and 8, any number of such work stations may be included in a typical system. Moreover, although operations work station is depicted as a desktop computer, operations works stations may include various types of personal computing devices such as laptops, netbooks, tablet computers, etc.

As with memory 130, storage system 750 can be of any type of computerized storage capable of storing information accessible by the server computing devices 710, such as a hard-drive, memory card, ROM, RAM, DVD, CD-ROM, write-capable, and read-only memories. In addition, storage system 750 may include a distributed storage system where data is stored on a plurality of different storage devices which may be physically located at the same or different geographic locations. Storage system 750 may be connected to the computing devices via the network 760 as shown in FIGS. 7 and 8, and/or may be directly connected to or incorporated into any of the computing devices 110, 710, 720, 730, 740, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As noted above, as vehicle 100 drives around, its perception system 172 may use the various sensors to detect and identify objects in the vehicle's environment. Again, at least some of these sensors may include the aforementioned camera groups. To ensure that the cameras of a given camera group are operating properly, the functionality of these cameras with may be assessed. In order to do so, two or more images, such as images 500 and 600, may be received by the computing devices 110 from the cameras of a camera group, such as camera group 300 (or camera group 400). Ideally, these images are captured very close in time or within some predetermined period of time so as to capture one or more of the same objects in the same position within the overlapping field of view.

In order to simplify processing of the images, the size of the images may be reduced. For instance, the computing devices 110 may reduce each image in size, for instance by thumbnailing, and/or otherwise cropping to include only the portions corresponding to the overlapping field of view.

Figure 9:
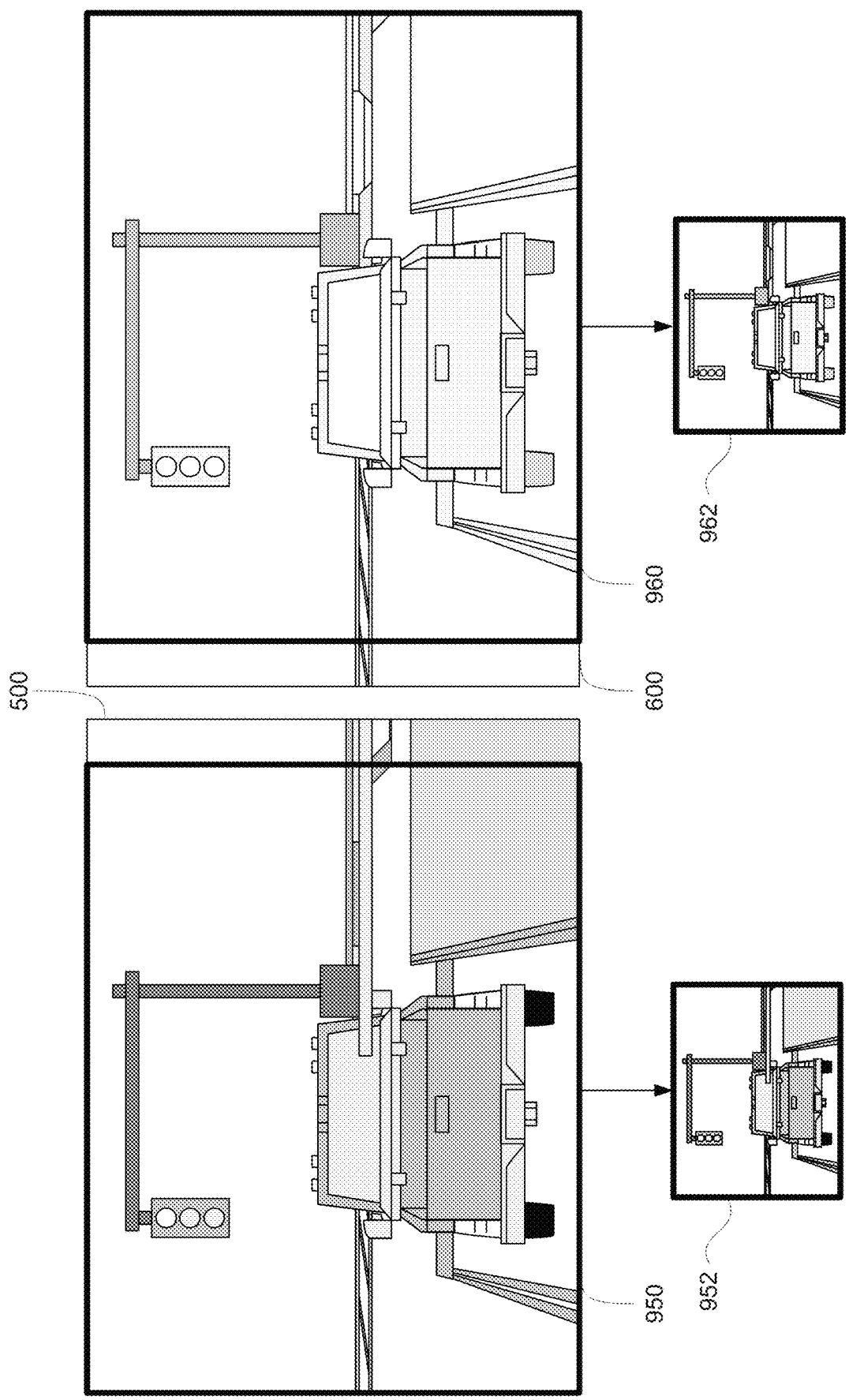
FIG. 9 is examples of cropping and reducing images in accordance with aspects of the disclosure.

Turning to FIG. 9, images 500 and 600 may be cropped into cropped areas 950, 960. These cropped areas to include only the portions corresponding to the overlapping portion 302 of field of views 312 and 322. The cropped areas 950, 960 may then be reduced or thumbnailed to reduce the number of pixels. The result is reduced images 952 and 962 which may include only pixels corresponding to the overlapping portion 302 of the fields of view of cameras 310 and 320. In this regard, the likelihood that both reduced images include the same object in the same position is very high. While in some instances the cropping may be avoided in order to detect very small occlusions, using images at their original resolution, this may make more the processing sensitive to small errors in the cameras' alignment as well as more sensitive to parallax.

The reduced (or non-reduced) images may then be analyzed to generate feature vectors. For instance, a first feature vector may be generated for reduced image 952 and a second feature vector may be generated for reduced image 962. These feature vectors thus represent the features in the reduced images.

One or more similarity scores may be determined using the first feature vectors of the reduced images from a camera group. For instance, the computing devices 110 may compare each pair of feature vectors (from pairs of reduced images from different cameras of a camera group) to determine a similarity score or how similar they are to one another. The similarity score may be determined using on a cosine similarity measure, clustering techniques, or other vector similarity measurement techniques. For instance, the structure similarity (SSIM) index may be used to measure the similarity between the feature vectors for the reduced images and determine a similarity score. In this regard, a high similarity score would indicate a high similarity of the features between the two reduced images, and a low similarity score would indicate a low similarity of the features between the two reduced images.

The similarity scores may be used to assess the operation of the cameras. For instance, the computing devices 110 may compare a similarity score to a threshold value to determine whether the similarity between the reduced images is too low, or rather the reduced images are so different that it is likely that one of the cameras has an error or is occluded. In many cases, the threshold may be sufficient to identify changes, such as when condensation forms slowly on one of the camera's lenses. The threshold may be selected in order to be sensitive enough to such changes without producing too many false-positives. For instance, if the SSIM score ranges from −1 to 1, a threshold may be set at 0.25 or more or less. It's not a very meaningful number by itself.

However, in some instances, such as where a crack is formed on one of the camera's lenses, the threshold may not necessarily identify the problem. In such instances, many images between two cameras may be compared by the computing devices 110 over time in order to identify abrupt changes. For instance, a cumulative sum control chart (CUSUM) may be used to identify abrupt changes in similarity scores over time which may not necessarily meet threshold value, but may also indicate that there is an issue with one of the cameras.

If the threshold is met or if an abrupt change is detected, the vehicle's computing devices may assume that one or both of the cameras has a problem. As such, the vehicle's computing devices may take an appropriate response. For instance, a cleaning system, such as cleaning system 314, 324, 414, 424, 434, for one or both cameras may be automatically activated. In addition or alternatively, a request may be sent by the computing devices 110 to a remote assistance operator, such as to computing device 740 and user 742, for instance via network 760, to check the camera images (either original or reduced). The remote assistance operator or user 742 may be able to determine whether a simple cleaning (by activating a cleaning system such as a wiper and washer fluid) is sufficient to correct the problem, if the vehicle should pull over, or if the camera is not a critical sensor, whether the vehicle should simply stop using information from that camera to make driving decisions. In some instances, the remote assistance operator or user 742 may be able to activate (and in some cases also deactivate) one or more of the cleaning systems remotely and view a second set of images to confirm whether the cleaning was sufficient. The computing devices 110 may also send via network 160 updated images from each camera of the camera group in order to allow the remote assistance operator or user 742 to confirm that the problem has been addressed.

In some instances, the computing devices 110 can avoid processing an invalid image or invalid portions of an image based on information that one or more cameras of a camera group have a problem. In addition or alternatively, the computing devices 110 may simply control the vehicle in the autonomous driving mode to pull over until the problem has been resolved.

The aforementioned process of processing images, detecting changes, and taking appropriate responses may be performed periodically such as every time a group images is captured by a camera group or less often.

Additional steps may also be taken in order to avoid false positives. For instance, when a vehicle is leaving a tunnel or an object close to one of the cameras causes some parallax, several frames captured by a camera may be aggregated together over time. These aggregated images may be reduced and used to generate the feature vectors as discussed above. In addition or alternatively, a depth map, generated from sensor data provided by one or more LIDAR sensors of perception system 172, may be used to "skip" or otherwise ignore areas of an image or reduced image in order to where parallax is likely to occur due to the movement of vehicle 100. In this regard, the feature vectors may be generated from parts of images or reduced images that are expected to be similar and not from parts of the images or reduced images that are expected to be different due to parallax.

While the aforementioned techniques may work well during day time or daylight hours where ambient lighting is good, in darker or nighttime environments, the similarity scores and SSIM may become unreliable. In this regard, during certain times of the day corresponding to evening or night time hours, rather than matching all features in two reduced images, only bright spots or high intensity areas may be compared. For instance, typically, light sources such as traffic lights and tail lights have known constant brightness because this is a legal requirement, so such lights should be visible in the reduced images. This bright spot approach does not depend on legal requirements for lights, nor does it apply only to vehicle lights. Rather, this approach is dependent on the fact that if a bright spot is visible in the camera with a neutral density (ND) filter (which blocks most of the light), then the same bright spot should also be visible in the other camera (which receives more light).

Figure 10:
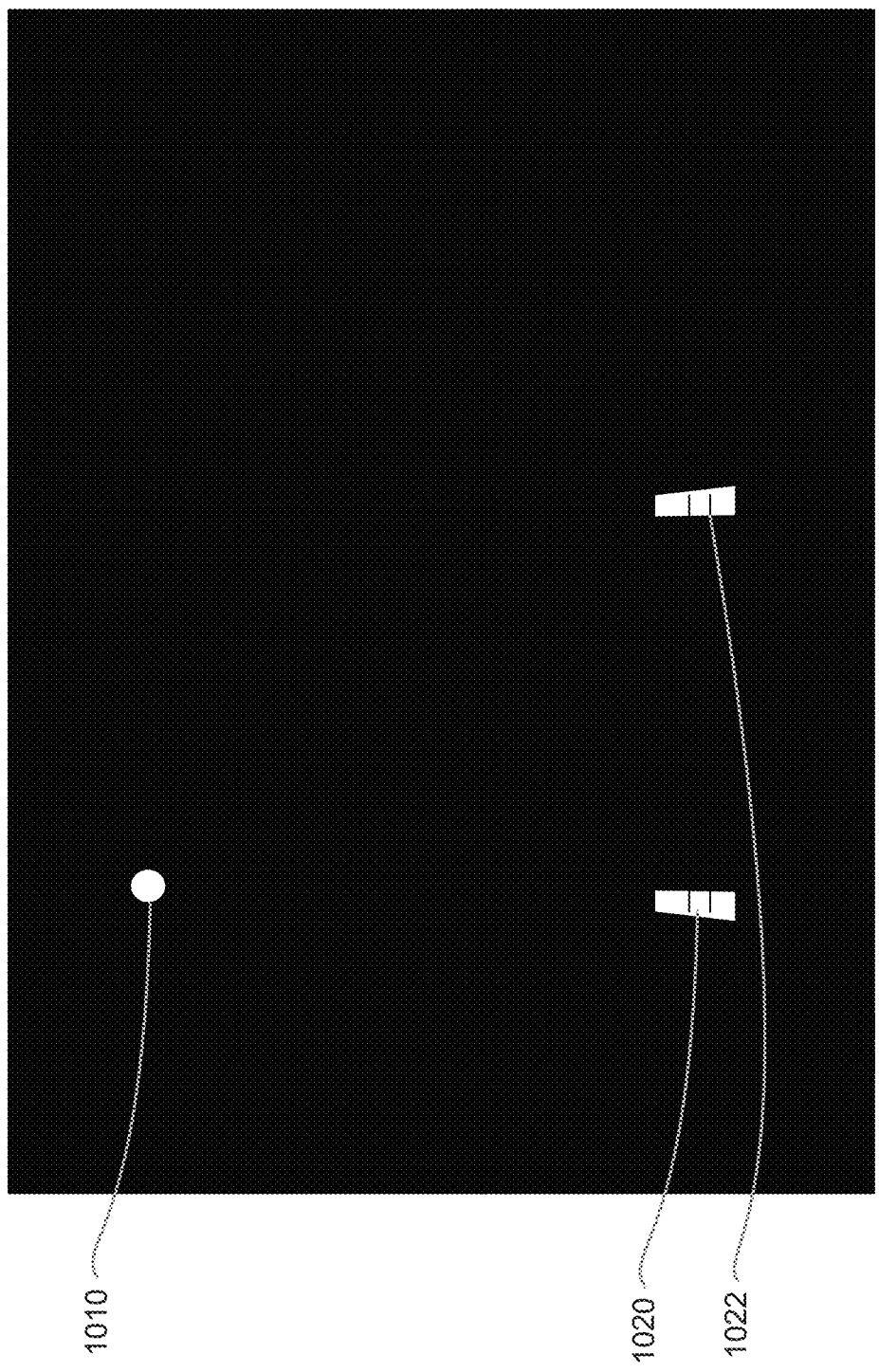
FIG. 10 is an example image in accordance with aspects of the disclosure.
Figure 11:
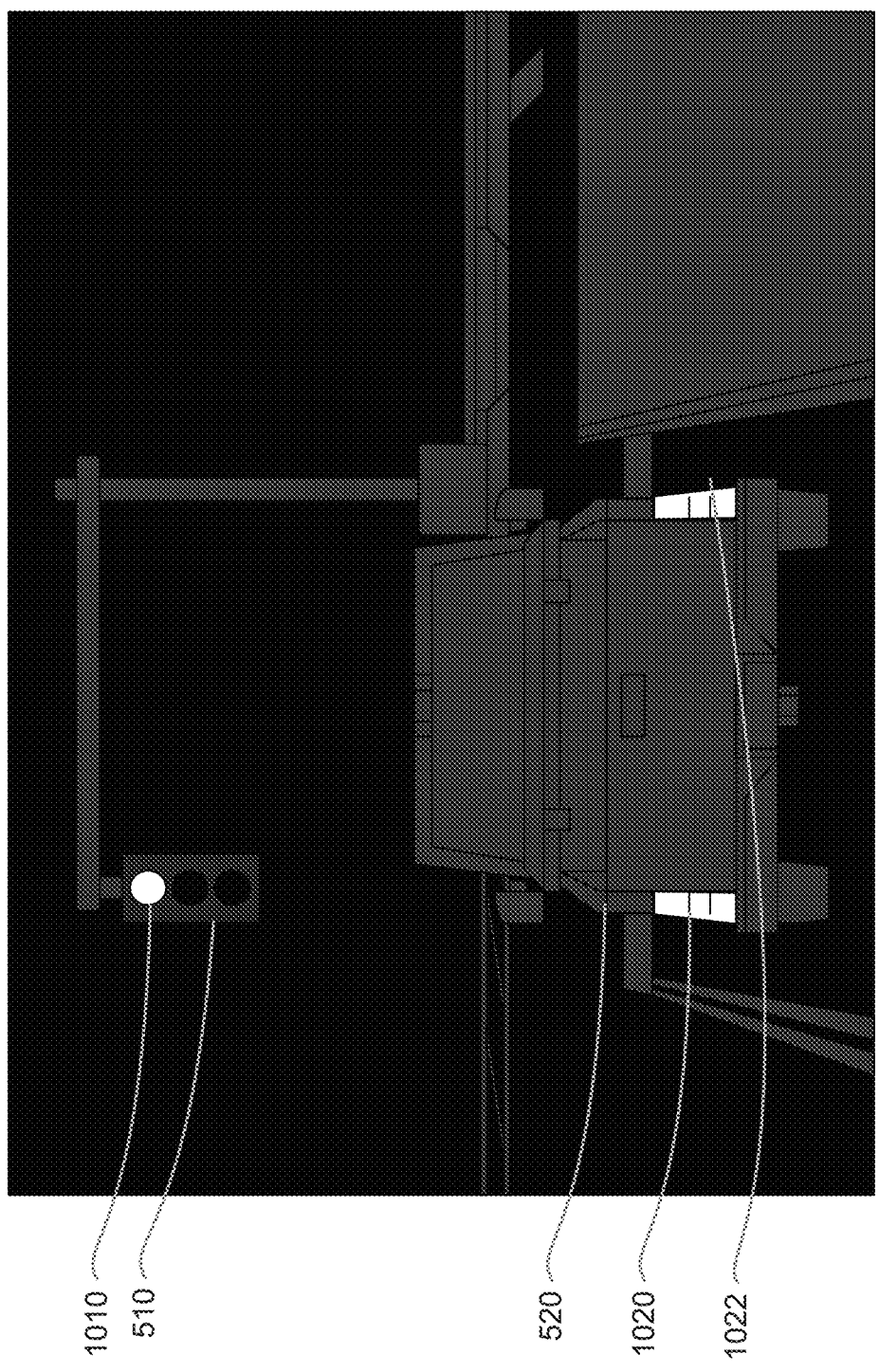
FIG. 11 is another example image in accordance with aspects of the disclosure.

For instance, referring to the images 1000 and 1100 of FIGS. 10 and 11, one image 1000 may be captured using a first camera, such as camera 310, with an ND filter over a first exposure period and a second image 1100 may be captured using a second camera, such as camera 320, without an ND filter over a second exposure period. The first and second exposure times may be the same or different, for instance, the second exposure period may be shorter than the first exposure period. For ease of understanding, images 1000 and 1100 correspond to images 500 and 600, respectively, though captured during night time hours. Thus, both images include traffic light 510 and vehicle 520, though they somewhat visible image in 1100 and not visible in image 1000 due to the use of the ND filter and exposure time. In this example, although the images appear dark, the bright spot 1010 of traffic light 510 and bright spots 1020, 1022 of the taillights of vehicle 520 are visible in both images 1000 and 1100.

Again, before generating the feature vectors for these images, the images may be cropped and reduced as discussed above. In addition, the feature vectors generated for these reduced images may be simplified. For instance, the feature vectors for images 1000 and 1100 may be generated in order to describe only the characteristics, such as shape, location and size, of features that correspond to bright spots. In other words, the feature vectors may include data only for features corresponding to light emitting objects in the reduced images. Thus, if there are very few light sources in the area, this process may be less effective. However, because the exposure parameters (shutter speed, analog gain, ND filter, etc.) of the images are known, the images can be also corrected for a wide range of exposure parameters. The SSIM approach, for instance, may handle differences up to about 6 stops (a factor of 64 times) relatively well.

The similarity scores for these vectors may again be determined using any of the examples described above, including SSIM. Of course, features describing the position of the bright spots will be the most important characteristic for comparison in such situations. Again, the similarity scores may be compared to a threshold and/or tracked using CUSUM to identify whether one of the cameras has an issue. Thereafter, an appropriate response may be taken as discussed above.

Figure 12:
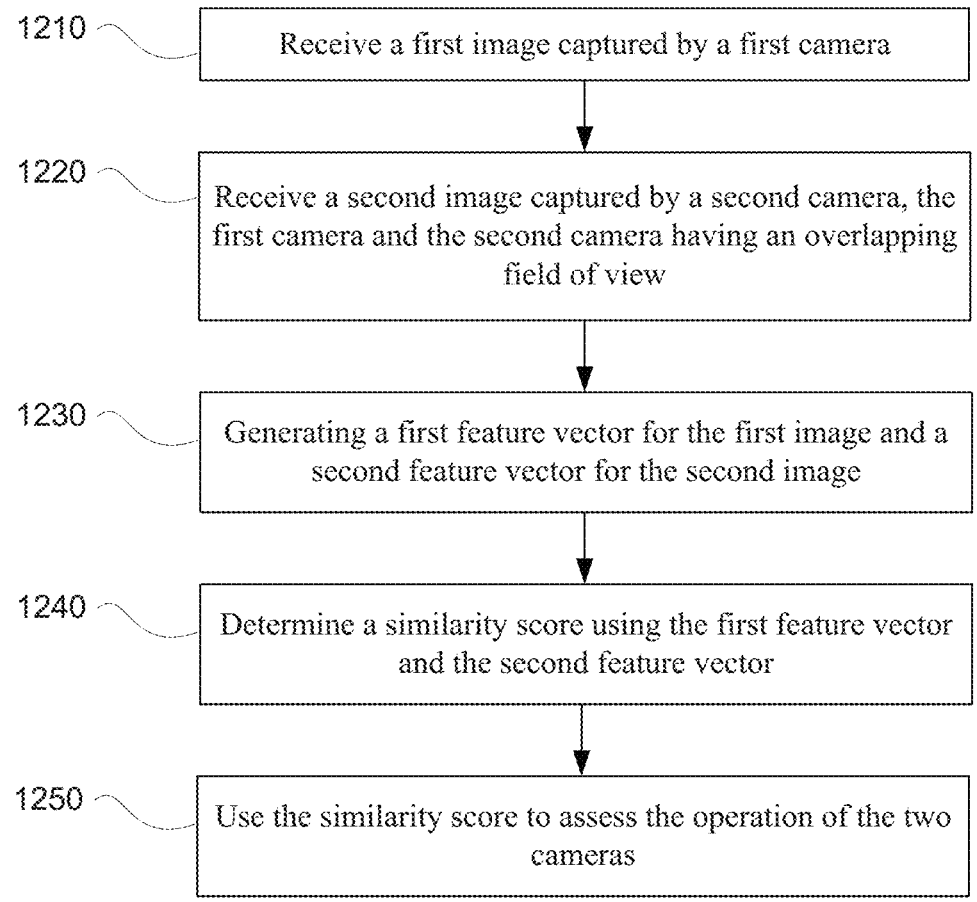
FIG. 12 is an example flow diagram in accordance with aspects of the disclosure.

FIG. 12 is an example flow diagram 1200 for assessing the operation of two or more cameras in accordance with some of the aspects described herein and that may be performed by one or more processors of one or more computing devices, such as processors 120 of computing devices 110. In this example, at block 1210, a first image captured by a first camera is received. At block 1220, a second image captured by a second camera is received. The first camera and the second camera have an overlapping field of view. At block 1230, a first feature vector for the first image and a second feature vector for the second image may be generated. At block 1240, a similarity score may be determined using the first feature vector and the second feature vector. At block 1250, the similarity score may be used to assess the operation of the two cameras.

The features described herein allow for reliable camera assessment during various lighting conditions. As noted above, it is incredibly challenging to determine whether a camera is "seeing" the world properly or if there is some foreign object debris on a lens, condensation, non-functioning pixels, etc. This can be especially important in the case of autonomous vehicles which rely upon such cameras to make driving decisions.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for assessing camera operation to make driving decisions of a vehicle in an autonomous driving mode, the method comprising:
   receiving, by one or more processors, first images captured by a first camera;
   receiving, by the one or more processors, second images captured by a second camera, the first camera and the second camera having an overlapping field of view;
   cropping, by the one or more processors, each of the first images and the second images to include only portions of the first images and the second images that correspond to the overlapping field of view;
   reducing, by the one or more processors, a size of each of the cropped first images and the cropped second images, wherein reducing the size of each of the cropped first images and the cropped second images includes thumbnailing the cropped first images and the cropped second images;
   generating, by the one or more processors, first feature vectors for the reduced first images and second feature vectors for the reduced second images;
   comparing, by the one or more processors, the first feature vectors to the second feature vectors to generate similarity scores, wherein each similarity score corresponds to a pair of feature vectors including at least one of the first feature vectors and at least one of the second feature vectors;
   comparing, by the one or more processors, pairs of the similarity scores over time in order to assess operation of the first camera and the second camera;
   generating, by the one or more processors, a driving decision for the vehicle based on whether the assessment indicates an abrupt change in the compared pairs of the similarity scores; and
   controlling, by the one or more processors, the vehicle to pull over or stop based on the driving decision.

2. The method of claim 1, wherein the first images and the second images are differently exposed.

3. The method of claim 1, wherein the first camera includes a neutral density (ND) filter and the second camera does not.

4. The method of claim 1, wherein an exposure period of the first images is longer than an exposure period of the second images.

5. The method of claim 1, wherein each of the first images and the second images are captured within a predetermined period of time so as to capture an object in a given position within the overlapping field of view.

6. The method of claim 1, wherein the first feature vectors and the second feature vectors are generated further based on a time of day.

7. The method of claim 1, wherein the first feature vectors and the second feature vectors are generated to include only features corresponding to light emitting objects.

8. The method of claim 1, wherein generating the similarity score includes using a structure similarity index.

9. The method of claim 1, wherein a cumulative sum control chart is used to detect the abrupt change in the compared pairs of the similarity scores.

10. The method of claim 1, further comprising, based on the assessment, sending a request for assistance to a remote computing device, the request including at least one of the first images and the second images.

11. The method of claim 10, further comprising, after sending the request, sending an updated image from the first camera and an updated image from the second camera to the remote computing device.

12. The method of claim 10, further comprising:
in response to the request, receiving instructions to stop the vehicle; and
stopping the vehicle in response to the request.

13. The method of claim 1, further comprising activating a cleaning system for one or both of the first camera and the second camera.

14. The method of claim 1, wherein controlling the vehicle includes discarding all or a portion of one or both of the reduced first images and the reduced second images when generating the driving decision.

15. The method of claim 1, wherein the first feature vectors and the second feature vectors are bright spots or high intensity areas.

16. The method of claim 1, wherein generating the driving decision is further based on information received from one or both of the first camera or the second camera.

17. A method for assessing camera operation to make driving decisions of a vehicle in an autonomous driving mode, the method comprising:
receiving, by one or more processors, first images captured by a first camera;
receiving, by the one or more processors, second images captured by a second camera, the first camera and the second camera having an overlapping field of view;
cropping, by the one or more processors, each of the first images and the second images to include only portions of the first images and the second images that correspond to the overlapping field of view;
reducing, by the one or more processors, a size of each of the cropped first images and the cropped second images, wherein reducing the size of each of the cropped first images and the cropped second images includes thumbnailing the cropped first images and the cropped second images;
assessing, by the one or more processors, operation of the first camera and the second camera based on the reduced first images and the reduced second images;
generating, by the one or more processors, a driving decision for the vehicle based on the assessing; and
controlling, by the one or more processors, the vehicle to pull over or stop based on the driving decision.

18. The method of claim 17, further comprising:
generating, by the one or more processors, first feature vectors for the reduced first images and second feature vectors for the reduced second images;
comparing, by the one or more processors, the first feature vectors to the second feature vectors to generate similarity scores, wherein each similarity score corresponds to a pair of feature vectors including at least one of the first feature vectors and at least one of the second feature vectors; and
comparing, by the one or more processors, pairs of the similarity scores over time.

19. The method of claim 18, wherein the assessment is further based on results of comparing the pairs of the similarity scores over time.

20. The method of claim 19, wherein the driving decision is generated based on whether the assessment indicates an abrupt change in the compared pairs of the similarity scores.

* * * * *